(12) United States Patent
Ota

(10) Patent No.: US 11,265,315 B2
(45) Date of Patent: Mar. 1, 2022

(54) INFORMATION PROCESSING TERMINAL, METHOD, AND SYSTEM INCLUDING INFORMATION PROCESSING TERMINAL

(71) Applicant: CANON KABUSHIKI KAISHA, Tokyo (JP)

(72) Inventor: Shunsuke Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 16/134,714

(22) Filed: Sep. 18, 2018

(65) Prior Publication Data

US 2019/0098003 A1 Mar. 28, 2019

(30) Foreign Application Priority Data

Sep. 25, 2017 (JP) .............................. JP2017-183524

(51) Int. Cl.
| | |
|---|---|
| H04L 29/06 | (2006.01) |
| G06F 21/64 | (2013.01) |
| G06F 21/32 | (2013.01) |
| G10L 17/06 | (2013.01) |
| G10L 17/22 | (2013.01) |
| H04W 88/02 | (2009.01) |

(52) U.S. Cl.
CPC .......... H04L 63/0861 (2013.01); G06F 21/32 (2013.01); G06F 21/64 (2013.01); G10L 17/06 (2013.01); G10L 17/22 (2013.01); H04L 63/12 (2013.01); H04W 88/02 (2013.01)

(58) Field of Classification Search
CPC ............................. G06F 21/32; H04L 63/086
See application file for complete search history.

(56) References Cited

U.S. PATENT DOCUMENTS

| | | | |
|---|---|---|---|
| 8,543,834 B1 | 9/2013 | Barra | |
| 2014/0259126 A1* | 9/2014 | Dykstra-Erickson | ... G06F 21/32 |
| | | | 726/5 |
| 2016/0253651 A1* | 9/2016 | Park | ........................ G07F 9/023 |
| | | | 705/39 |
| 2018/0130475 A1* | 5/2018 | Page | ........................ G06F 21/32 |

FOREIGN PATENT DOCUMENTS

| | | |
|---|---|---|
| DE | 202016008226 U1 | 6/2017 |
| EP | 2397972 A1 | 12/2011 |
| JP | 2003143136 A | 5/2003 |
| JP | 2007-133515 A | 5/2007 |
| JP | 2016-517548 A | 6/2016 |
| JP | 2017-44778 A | 3/2017 |
| JP | 2017-103546 A | 6/2017 |
| KR | 10-1198120 B1 | 11/2012 |
| WO | 2007/094165 A1 | 8/2007 |

* cited by examiner

*Primary Examiner* — Dao Q Ho

(74) *Attorney, Agent, or Firm* — Canon U.S.A., Inc. IP Division

(57) ABSTRACT

An information processing terminal, including a speaker unit, for receiving and processing an input of voice information, performs control, in a case where it is determined that authentication is needed for execution of a service corresponding to an input of voice information, to perform biometric authentication using information extracted as biological information of a user corresponding to the input voice information, and notifies, in a case where the biometric authentication is successful, the user via the speaker unit of a message regarding the execution of the service as a response to the input of the voice information.

9 Claims, 13 Drawing Sheets

VOICE ASSISTANT 102

SERVICE SERVER 103

MOBILE TERMINAL 104

VOICE ASSISTANT 102

SERVICE SERVER 103

MOBILE TERMINAL 104

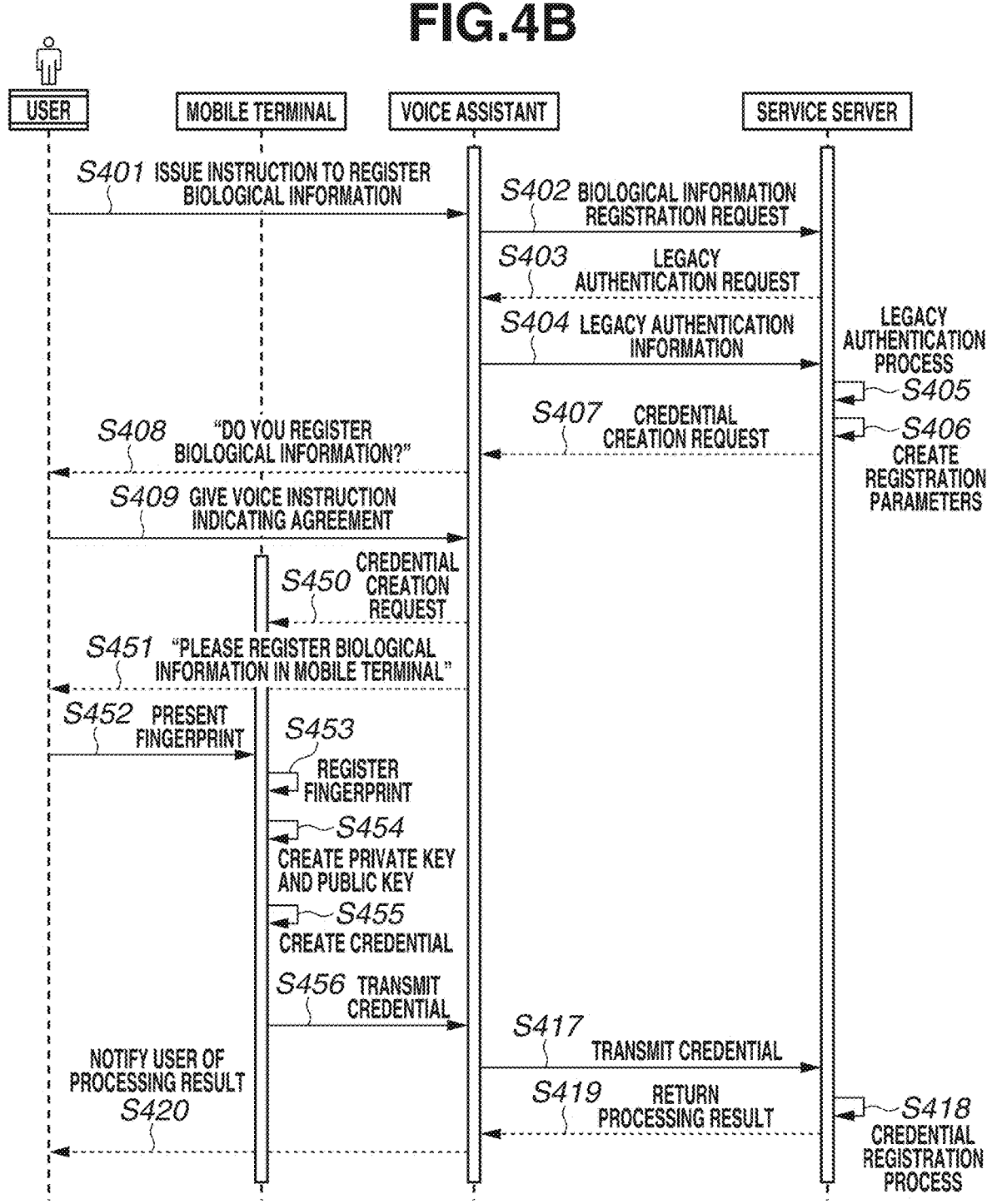

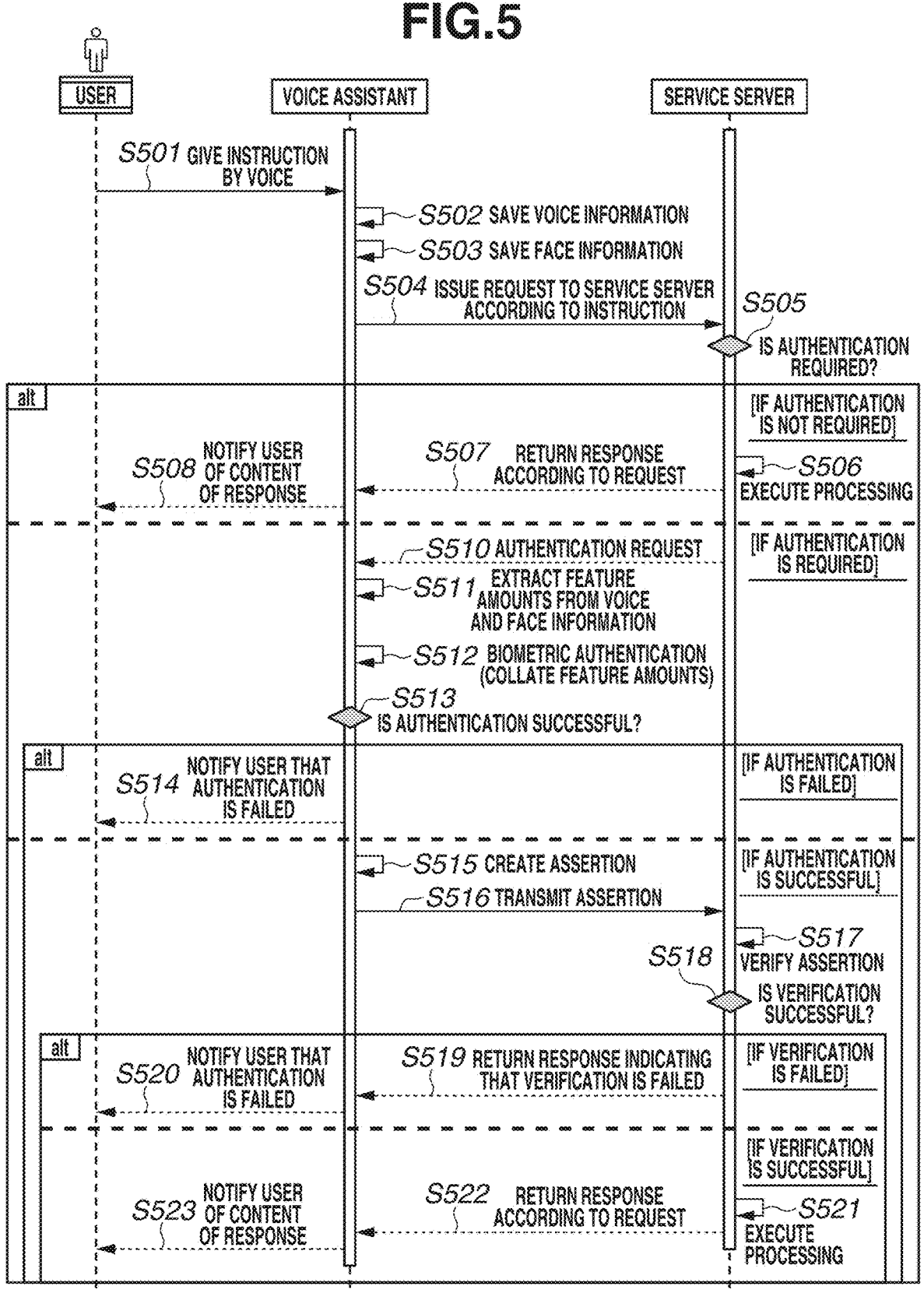

REGISTRATION PARAMETERS

CREDENTIAL CREATION REQUEST

CREDENTIAL

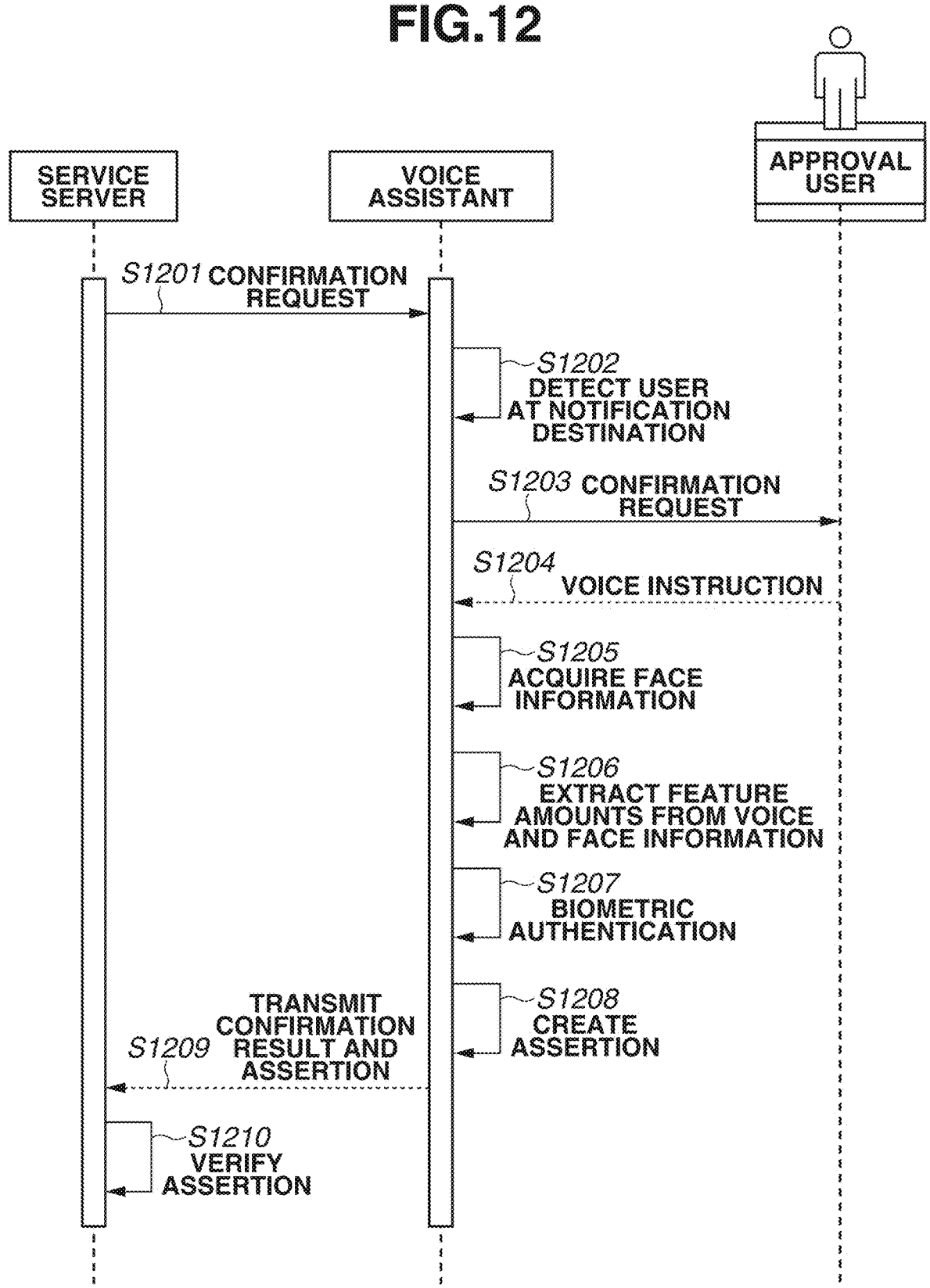

INFORMATION PROCESSING TERMINAL, METHOD, AND SYSTEM INCLUDING INFORMATION PROCESSING TERMINAL

BACKGROUND

Field

The present disclosure relates to a technique for achieving a special service using a device (a voice assistant) that receives voice input, automatically executes processing, and transmits a message via a speaker unit.

Description of the Related Art

In recent years, a device (a voice assistant) that receives voice input, automatically executes processing, and transmits a message via a speaker unit is increasingly used. The voice assistant is an information device with a function that interprets the utterance of a user by a speech recognition function and executes various instructions provided by the user. Since an instruction can be provided by voice, the voice assistant has the advantage of saving a user the trouble of performing a key operation or providing a touch input on a conventional personal computer or smartphone. The voice assistant can also transmit a processing result or a notification (electronic mail) from an external service to the user as a voice message via the speaker unit.

As an example of a method using the voice assistant, the voice assistant is installed in a living room and other rooms of a user's home to enable the user to provide an instruction to the voice assistant via voice, to play desired music, or order a product using a shopping service published on the Internet.

Even when the user orders a product using a shopping service via the voice assistant, it is necessary to perform authentication based on user information registered in advance in the shopping service. For example, when ordering a product, the user provides voice input of a user identification (ID) or a password for the voice assistant whereby user authentication can be performed. Alternatively, instead of the password, voice information (a voiceprint) of the user can be registered in advance in the shopping service, whereby an authentication server of the shopping service can perform biometric authentication to authenticate the user authentication. In the publication of Japanese Patent Application Laid-Open No. 2017-44778, in addition to authentication using a voiceprint, authentication is performed based on whether a voice estimated from a change over time in the motion of a user's lips match voiceprint information, whereby authentication can be performed with higher accuracy.

When receiving an instruction by voice input from the user, the voice assistant issues a request to a corresponding network service as necessary. In such a case, a service provision system using the voice assistant includes, in addition to a service that requires authentication (e.g., a shopping service), a service that does not require authentication, such as a keyword search using a search service. That is, an authentication process need not be performed in advance using the voice assistant in a case where a service that does not need authentication is requested. In a case where an authentication request is returned from a network service having received a request from the voice assistant, it is necessary to urge the user to again perform authentication at this timing.

In a case where a network service is used starting from when a voice instruction is given to a voice assistant, authentication work has much to be elaborated in terms of usability.

SUMMARY

According to an aspect of the present invention, an information processing terminal, including a speaker unit, for receiving and processing an input of voice information, the information processing terminal includes a notification unit configured to, in a case where authentication is not needed for execution of a service corresponding to an input of voice information, notify a user via the speaker unit of a message regarding the execution of the service as a response to the input of the voice information, and a control unit configured to, in a case where it is determined that authentication is needed for execution of the service corresponding to the input of the voice information, perform control to perform biometric authentication using information extracted as biological information of a user corresponding to the input voice information, wherein in a case where the biometric authentication is successful, the notification unit notifies the user via the speaker unit of the message regarding the execution of the service, as a response to the input of the voice information.

Further features will become apparent from the following description of exemplary embodiments with reference to the attached drawings.

BRIEF DESCRIPTION OF THE DRAWINGS

FIGS. 4A and 4B are diagrams illustrating sequences of processing regarding registration of a credential corresponding to biological information.

FIG. 5 is a diagram illustrating a sequence regarding processing executed based on a voice instruction according to a first exemplary embodiment.

FIG. 12 is a diagram illustrating a sequence regarding details of a confirmation process according to a third exemplary embodiment.

DESCRIPTION OF THE EMBODIMENTS

Exemplary embodiments for carrying out the present disclosure will be described below with reference to the drawings.

In the present disclosure, as an authentication system, a mechanism using biometric authentication, such as technology termed Fast Identity Online (FIDO), is used. Unlike a password in ID/password authentication, biological information such as a fingerprint or a vein for use in biometric authentication cannot be rewritten in a case where the information is disclosed. Thus, recovery from such information disclosure is typically impossible. In response, in FIDO, an authentication process is performed not on a server via a network, but on a terminal that a user has access to. Thus, biological information is not disclosure onto the network, resulting in minimizing the risk of information disclosure.

In the following description, to receive from a service provision system a service that needs authentication, an authentication process using biological information is performed in a terminal that a user has access to instead of in an authentication system on the Internet. Examples of the terminal include an information processing terminal (e.g., a voice assistant or a robot) for recognizing an input of voice information and automatically performing necessary processing, a mobile phone, and a smartphone.

Figure 1:
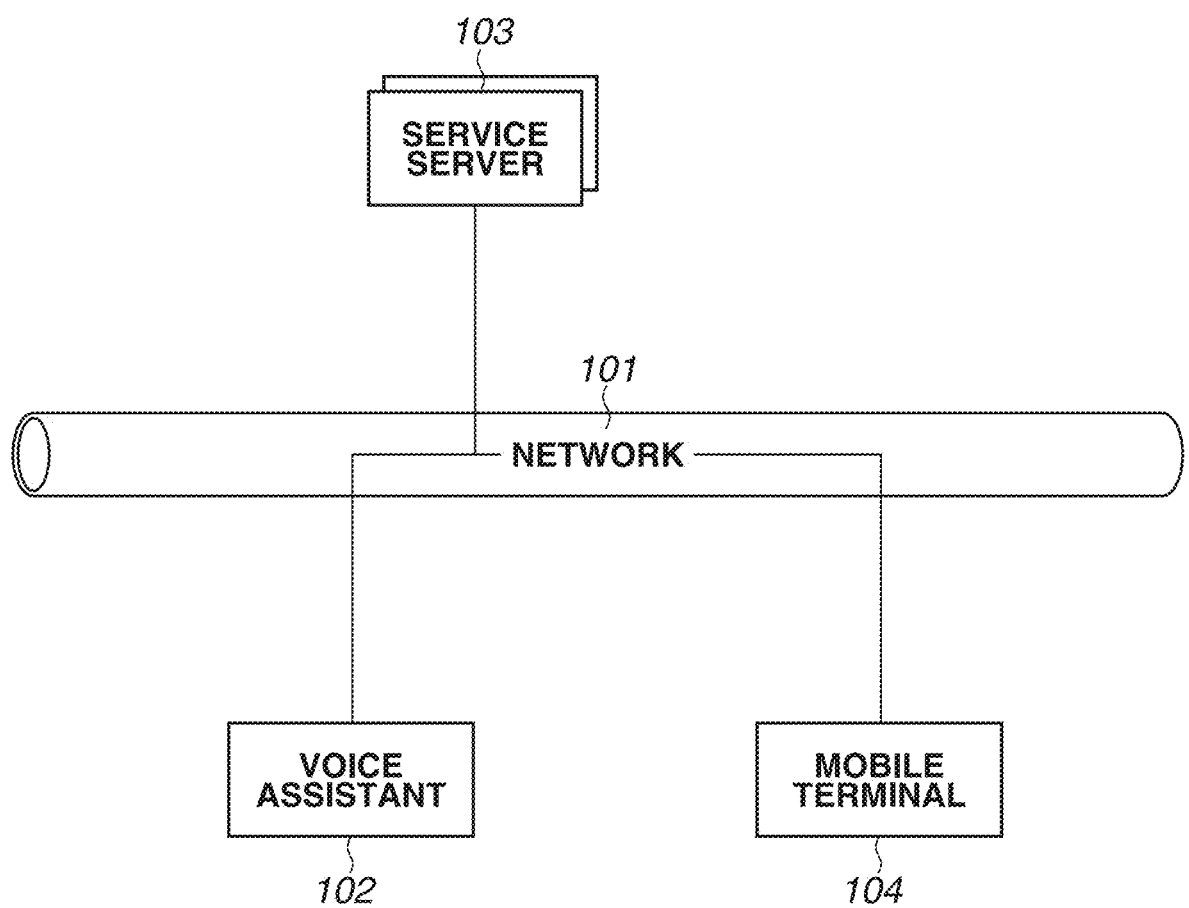
FIG. 1 is a diagram illustrating an example of a configuration of a network system.

FIG. 1 is a diagram illustrating the overall configuration of a system according to exemplary embodiments.

In FIG. 1, a voice assistant 102, a service server 103, and a mobile terminal 104 are connected together via a network 101.

The network 101 is a communication network achieved by, for example, any of a local area network (LAN) for the Internet, a wide area network (WAN), a telephone circuit, a dedicated digital circuit, an Asynchronous Transfer Mode (ATM) or frame relay circuit, a cable television circuit, a data broadcasting wireless circuit, or any combination of these. The network 101 should allow transmission and receipt of data.

The voice assistant 102 is an example of an information processing terminal, including artificial intelligence (AI), for recognizing an input of human voice information and automatically performing necessary processing. The voice assistant 102 includes at least a microphone, and executes various operations based on voice instructions from a user. The voice assistant 102 can transmit a message via a speaker device. The voice assistant 102 can include a camera. The voice assistant 102 verifies biological information detected from input data from the microphone or the camera. A program for performing biometric authentication also operates on the voice assistant 102. The voice assistant 102 can be configured in various forms, and can be implemented as part of a robot, a dedicated personal computer, a household electrical appliance, or a remote controller.

The service server 103 is, for example, a server for providing various Internet services, such as a music distribution service and a shopping service. A service for managing user information also operates on the service server 103. The configuration can be such that different servers are provided for the respective services that cooperate with each other.

The mobile terminal 104 is a mobile terminal, such as a general mobile phone, smartphone, tablet, or wearable terminal. The mobile terminal 104 includes an environment for executing applications for providing a web browser and a telephone function. The mobile terminal 104 also includes a sensor and a camera for acquiring biological information for authenticating an individual. A program for performing biometric authentication also operates on the mobile terminal 104. In a first exemplary embodiment, the mobile terminal 104 is not an essential component.

Figure 2A:
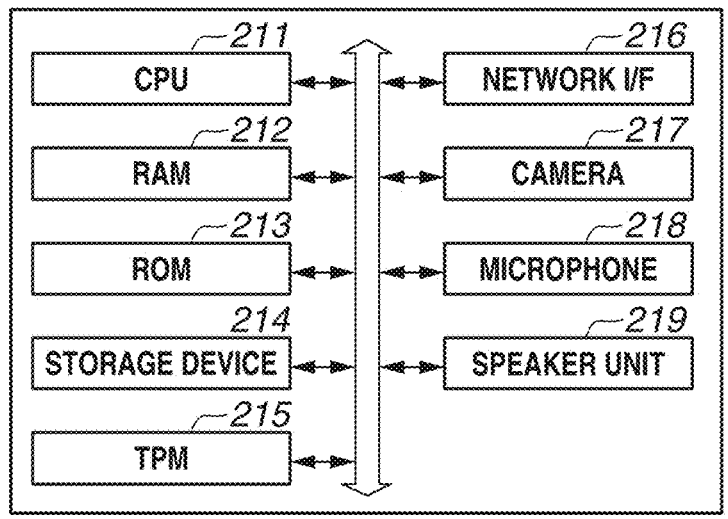
FIGS. 2A, 2B, and 2C are diagrams illustrating examples of hardware configurations of apparatuses included in the network system.
Figure 2B:
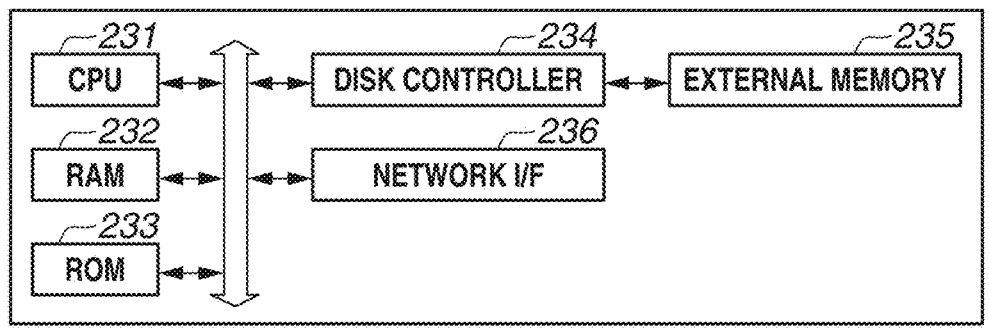
Figure 2C:
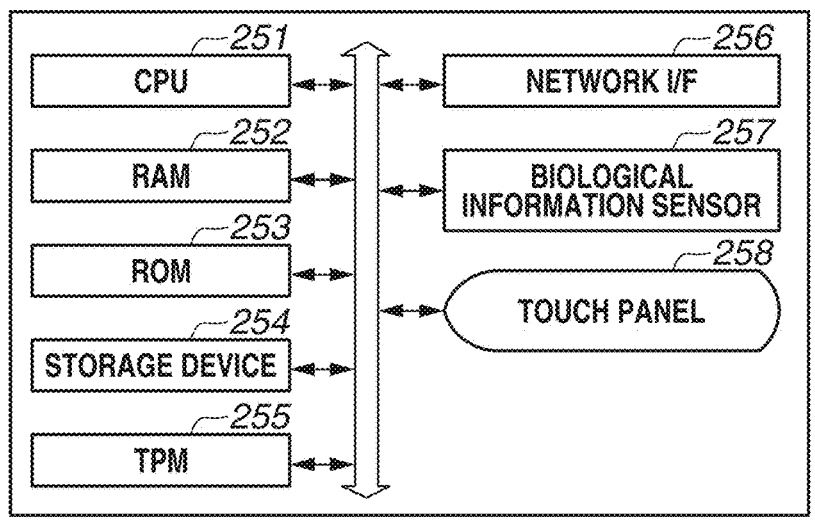

FIGS. 2A, 2B, and 2C are diagrams illustrating examples of the hardware configurations of the apparatuses included in the network system.

FIG. 2A is a hardware configuration diagram of the voice assistant 102.

A central processing unit (CPU) 211 executes a program stored in a read-only memory (ROM) 213 or a program such as an operating system (OS) or an application loaded from a storage device 214 into a random-access memory (RAM) 212. That is, the CPU 211 executes the program stored in a storage medium readable by the CPU 211, thereby functioning as processing units for executing the processing of flowcharts described below. The RAM 212 is a main memory for the CPU 211 and functions as a work area.

A Trusted Platform Module (TPM) 215 is a security chip with tamper resistance for functioning independently of the OS or other pieces of hardware and is a storage unit for processing and storing secret information. In the present disclosure, biological information of a user for use in biometric authentication and a private key necessary for an authentication process are stored in the TPM 215. The present disclosure can also be achieved by, as an alternative to the TPM 215, a method for reserving a secure memory space operating in isolation from other components on a single chip to achieve tamper resistance, and for providing a storage unit for managing the biological information (or the feature amount of the biological information) of the user and the private key in the memory space. The biological information of the user for use in biometric authentication is data (a signal) of a voiceprint, a fingerprint, a face, or an iris detected from data input by the microphone or the camera, or the feature amount of the data.

A network interface (I/F) 216 is connected to the network 101 via a wired or wireless interface and executes a communication control process with another device on the network 101. A camera 217 is hardware for capturing the face of the user. A microphone 218 is hardware for collecting the sound of the voice of the user. A speaker unit 219 is a hardware device used to notify the user of a processing result.

FIG. 2B is a hardware configuration diagram of the service server 103. The service server 103 can be configured using the hardware of a general information processing apparatus (server computer).

A CPU 231 executes a program stored in a ROM 233 or a program such as an OS or an application loaded from an external memory 235, such as a hard disk (HD), into a RAM 232. That is, the CPU 231 executes the program stored in a storage medium readable by the CPU 231, whereby the CPU 231 functions as processing units for executing the processing of sequences or flowcharts described below. The RAM 232 is a main memory for the CPU 231 and functions as a work area. A disk controller 234 controls access to data in the external memory 235 such as an HD that stores various types of data. A network I/F 236 is connected to the network 101 and executes a communication control process with another device connected to the network 101.

FIG. 2C is a hardware configuration diagram of the mobile terminal 104.

A CPU 251, a RAM 252, a ROM 253, a storage device 254, a network I/F 256, and a TPM 255 are components with functions similar to those of the components with the same names in the voice assistant 102, and therefore are not described here. A biological information sensor 257 is a sensor for reading biological information of the user. The biological information sensor 257 reads a living body such as the fingerprint, the iris, or the vein of the user and converts the living body into a signal (biological information). A touch panel 258 has two functions, a display function and an input function. The touch panel 258 displays a screen of an application and a keyboard. The user applies pressure to the screen with the user's finger(s) or a dedicated pen, whereby the touch panel 258 outputs information of the touched position on the screen as an information signal to outside. The application uses the output information signal, whereby the user can operate the application via the touch panel 258.

Figure 3A:
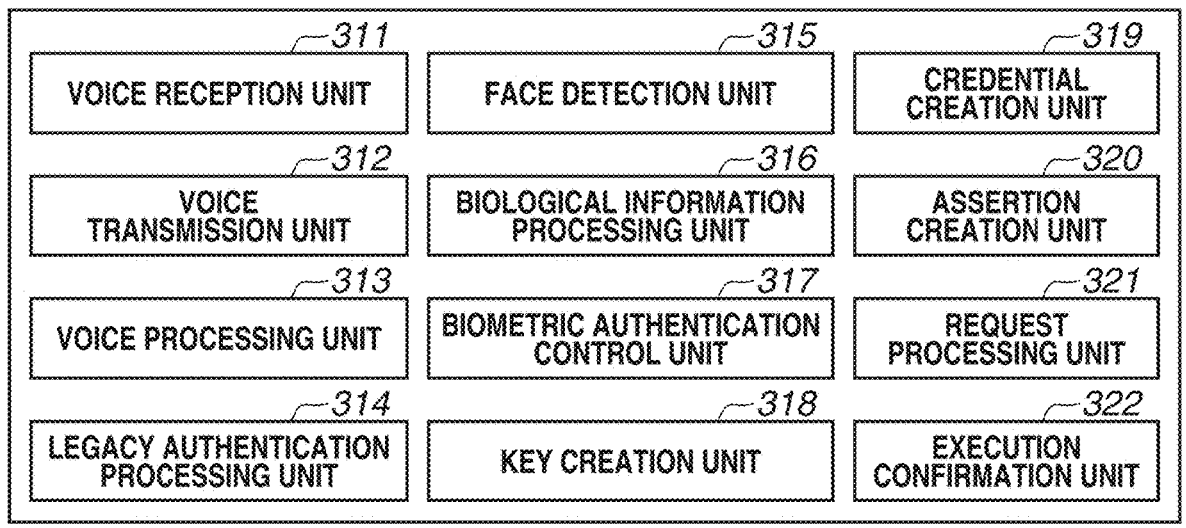
FIGS. 3A, 3B, and 3C are diagrams illustrating examples of functional blocks of the apparatuses included in the network system.
Figure 3B:
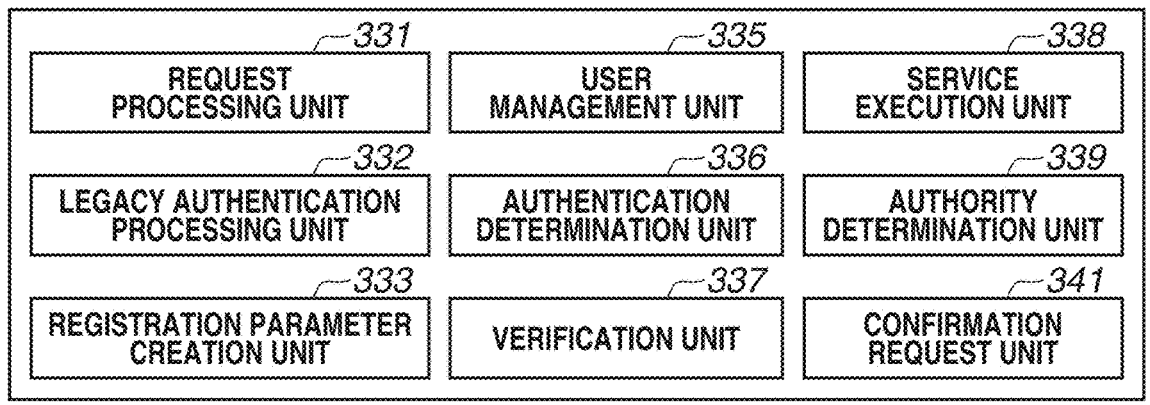
Figure 3C:
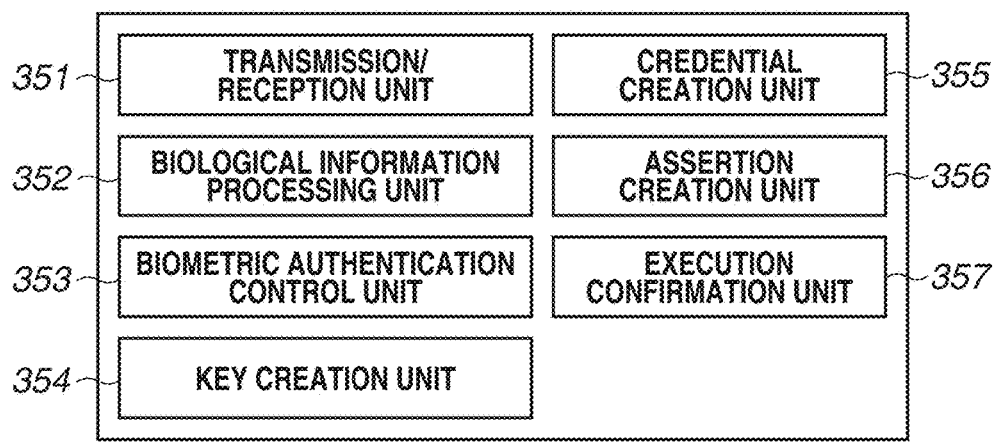

FIGS. 3A, 3B, and 3C are diagrams illustrating examples of the configurations of functional blocks achieved by the software of the apparatuses included in the network system.

FIG. 3A is an example of the configuration of the functional block of the voice assistant 102, which is achieved by the CPU 211 executing a program.

Using the microphone 218, a voice reception unit 311 receives voice input from the user of the voice assistant 102. Using the speaker unit 219, a voice transmission unit 312 transmits a message (a machine voice) to the user of the voice assistant 102.

A voice processing unit 313 performs the process of inputting voice data to be input to the voice assistant 102 or outputting voice data to be transmitted from the voice assistant 102, and analyzes voice data. The voice processing unit 313 extracts a voiceprint as biological information (or the feature amount of the biological information) from voice data. When analyzing voice data and if detecting that an input corresponding to a predetermined instruction is included in the input voice data, the voice processing unit 313 generates a request corresponding to the instruction. In this process, the voice processing unit 313 generates the request by referencing a table (not illustrated) including the association between an input and an instruction (a command or the type of an application programming interface (API) to be called). Such a table is managed by the storage device 214. In this table, information of a service provision source (the voice assistant 102 or the service server 103) as a target of the request is also managed. Such a table can also be configured to be managed on an external network, such as a cloud service, so that the table can be referenced by the voice processing unit 313 and a request processing unit 321.

Using the camera 217, a face detection unit 315 detects a face image of a person. The face detection unit 315 extracts biological information (or the feature amount of the biological information) corresponding particularly to the face image from image data captured by the camera 217. The face detection unit 315 can extract, as biological information to be extracted from the person whose face is detected, another piece of biological information such as a fingerprint or an iris that can be extracted from the image data captured by the camera 217. The face detection unit 315 can also detect the face of a pet or a robot in addition to a human being and can also extract individual unique information equivalent to biological information from captured image data as necessary.

A legacy authentication processing unit 314 receives a request such as the registration of a user from a device such as the mobile terminal 104 connected to the voice assistant 102 via the network I/F 216 and processes information for legacy authentication to be performed when user information is registered. Specifically, the legacy authentication processing unit 314 receives the registration of an identification (ID) and a password of a user account and saves the ID and the password in the storage device 214. Then, according to the input of the ID and the password, the legacy authentication processing unit 314 executes legacy authentication.

A biological information processing unit 316 manages biological information using the TPM 215. If legacy authentication of a user is successful, and when biological information of the user is to be registered, biological information extracted by the voice processing unit 313 is registered in the TPM 215 in association with the ID of the user. Table A illustrates an example of data saved by the biological information processing unit 316.

TABLE A

| Authentication Information ID | Service ID | Voiceprint Information | Face Information |
|---|---|---|---|
| 407c-8841-79d | shopping.com | 0101110101010110 . . . | 1110111010011100000s . . . |
| 4c04-428b-a7a2 | music.com | 0110001110101010 . . . | 01110110110111110111 . . . |
| 4c41-448b-bda2 | shopping.com | 0101110101010000 . . . | |
| . | . | . | . |
| . | . | . | . |
| . | . | . | . |

An authentication information ID is a unique ID assigned to biological information (or the combination of pieces of biological information) for use in authentication. In a "service ID" column, a service ID for identifying a service that requires authentication is set. The service ID indicates information of the top-level domain and the second-level domain of the service. For example, if the Uniform Resource Locator (URL) of a shopping service is "http://www.shopping.com", the service ID is "shopping.com". In a "voiceprint information" column and a "face information" column, biological information extracted by the voice processing unit 313 and the face detection unit 315 is saved.

A biometric authentication control unit 317 collates biological information extracted by the voice processing unit 313 or the face detection unit 315 with information registered in the TPM 215 to determine whether these pieces of information match each other, to execute an authentication process based on the biological information.

A key creation unit 318 creates a pair of a private key and a public key corresponding to biological information registered in the TPM 215. The created private key is saved in the TPM 215 in association with the corresponding biological information. In the present exemplary embodiment, the private key is saved as illustrated in table B.

TABLE B

| Authentication Information ID | Service ID | Private Key |
|---|---|---|
| 407c-8841-79d | shopping.com | 1faea2da-a269-4fa7-812a-509470d9a0cb |
| 4c04-428b-a7a2 | music.com | d7ae30c8-3775-4706-8597-aaf681bc30f5 |
| . | . | . |
| . | . | . |
| . | . | . |

In an "authentication information ID" column and a "service ID" column, values similar to those of the IDs described in table A are set. In a "private key" column, information of a private key created by the key creation unit 318 is saved.

A credential creation unit 319 creates a credential to be registered in an external service. An assertion creation unit 320 creates an assertion (described in detail below) including verification data for confirming a user in an external service.

The request processing unit 321 transmits, to the service server 103 via the network I/F 216, a request corresponding to an instruction from a user specified by the voice processing unit 313. The request processing unit 321 transmits, via the network I/F 216, a request including data created by the network I/F 216 or the assertion creation unit 320. The request processing unit 321 processes an externally generated request. If there is data to be transmitted to the user, the request processing unit 321 transfers the data to the voice processing unit 313 and the voice transmission unit 312. Then, using the speaker unit 219, the request processing unit 321 transmits a message (a machine voice) to the user of the voice assistant 102.

The execution confirmation unit 322 causes the voice transmission unit 312 to transmit, from the speaker unit 219, a message for inquiring whether processing can be executed. The voice reception unit 311 receives a response from the user, and based on the analysis result of the voice processing unit 313, the execution confirmation unit 322 determines whether processing can be executed.

FIG. 3B is an example of the configuration of the functional block of the service server 103, which is achieved by the CPU 231 executing a program.

A request processing unit 331 processes a request received via the network 101. A legacy authentication processing unit 332 executes legacy authentication using an ID and a password. A registration parameter creation unit 333 creates registration parameters. A user management unit 335 saves and manages user information for use in legacy authentication and information of a public key, using the external memory 235.

An authentication determination unit 336 determines whether requested processing requires authentication. A verification unit 337 verifies an assertion. Specifically, using a public key, the verification unit 337 verifies signature data included in an assertion. A service execution unit 338 executes requested processing, transmits the processing result to the voice assistant 102, or provides a service corresponding to the requested processing.

An authority determination unit 339 determines whether a request user has authority to execute a service, and the level of the authority. In the present exemplary embodiment, the authority determination unit 339 is not an essential component. A confirmation request unit 341 is a component for making a request to confirm whether the execution of a service is permitted.

FIG. 3C is an example of the configuration of the functional block of the mobile terminal 104, which is achieved by the CPU 251 executing a program.

A transmission/reception unit 351 communicates with devices external to the mobile terminal 104 via the network I/F 256.

A biological information processing unit 352 is a module equivalent to the biological information processing unit 316 and manages biological information together with an authentication information ID and a service ID using the TPM 255. A biometric authentication control unit 353 is a module equivalent to the biometric authentication control unit 317 and collates biological information extracted by the biological information sensor 257 with information registered in the TPM 255 to determine whether these pieces of information match each other, to execute an authentication process based on the biological information.

A key creation unit 354 is a module equivalent to the key creation unit 318 and creates a pair of a private key and a public key corresponding to biological information registered in the TPM 255. The created private key is saved in the TPM 255 in association with the corresponding biological information.

A credential creation unit 355 is a module equivalent to the credential creation unit 319 and creates a credential (which is described below) to be registered in an external service. An assertion creation unit 356 is a module equivalent to the assertion creation unit 320 and creates an assertion including verification data for confirming a user in an external service.

An execution confirmation unit 357 is a module equivalent to the execution confirmation unit 322 and outputs on the touch panel 258 a message for inquiring whether processing can be executed. Based on a user operation, the execution confirmation unit 357 determines whether processing can be executed.

A function according to the present exemplary embodiment is broadly classified into two processes, namely "the process of registering biological information in the voice assistant" and "the process of executing an instruction using the voice assistant".

In the present exemplary embodiment, as an example of the instruction via the voice assistant 102, an instruction regarding shopping through a shopping service is used. The instruction via the voice assistant 102, however, is not limited to this. For example, the instruction via the voice assistant 102 can be provided regarding a music purchase/distribution service for members. Examples of the biological information to be verified by the voice assistant 102 include two pieces of information, namely face information and voiceprint information. The biological information to be verified by the voice assistant 102, however, is not limited to this. For example, in a case where the camera 217 has high accuracy, another piece of biological information, such as iris information, can be used.

Figure 4A:
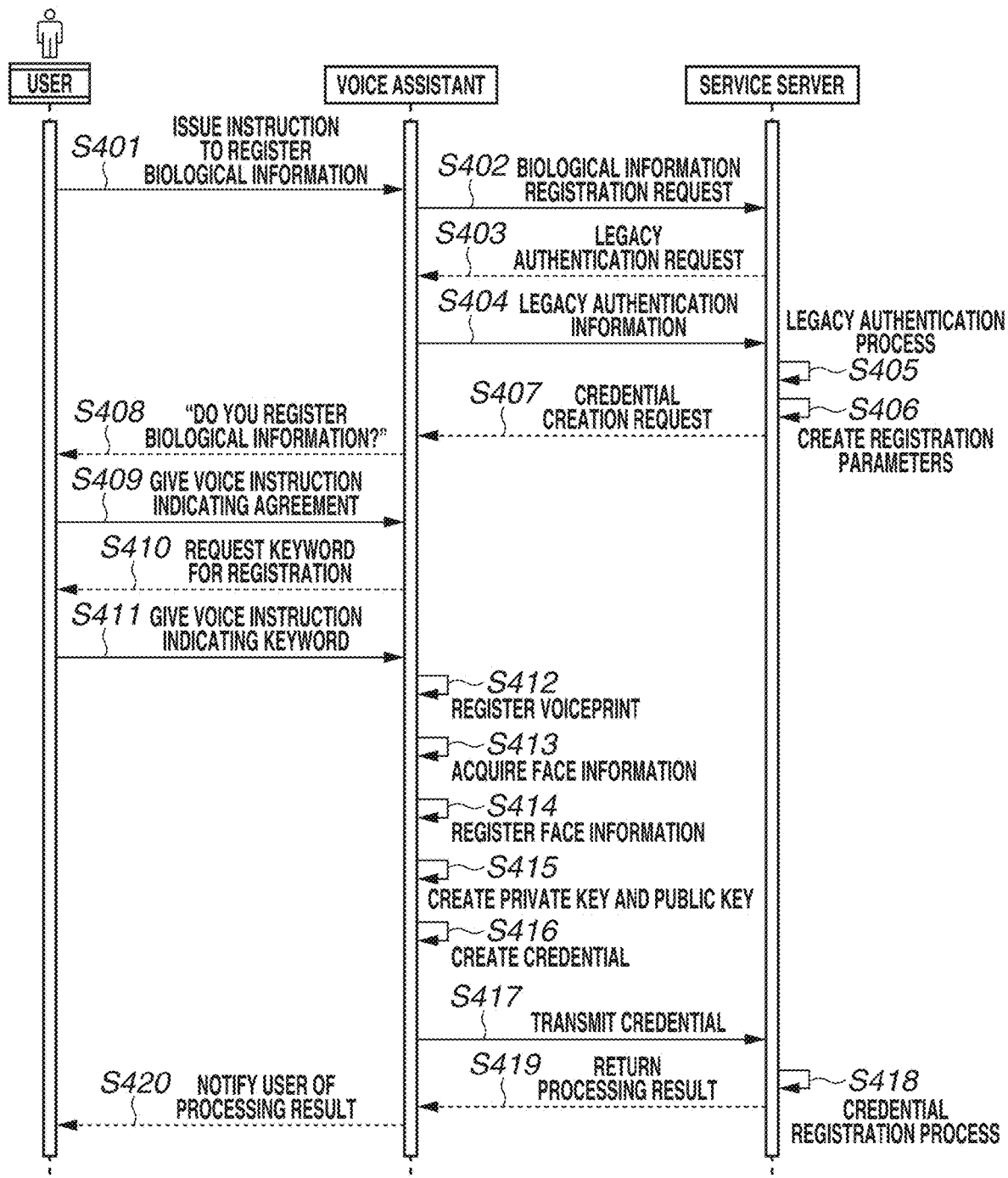

With reference to a sequence diagram illustrated in FIG. 4A, "the process of registering biological information in the voice assistant" is described.

In step S401, the voice reception unit 311 receives an instruction to register biological information from the user of the voice assistant 102. The instruction can be, for example, an instruction using a keyword determined in advance, such as "the registration of biological information in a shopping service A", or a colloquial instruction such as "I want to register biological information in the shopping service A" depending on the function of the voice assistant 102. The voice processing unit 313 transfers to the biological information processing unit 316 the instruction to register biological information detected from voice input. The biological information processing unit 316 generates a biological information registration request to the service server 103. In step S402, the request processing unit 321 transmits the biological information registration request to the service server 103.

In step S403, the legacy authentication processing unit 332 generates a legacy authentication request as a response to the biological information registration request received via the request processing unit 331 and returns the legacy authentication request to the voice assistant 102.

In step S404, the legacy authentication processing unit 314 acquires saved legacy authentication information and transmits the legacy authentication information to the request processing unit 331. This process uses an ID and a password for legacy authentication registered when the user of the voice assistant 102 registers the user in the voice assistant 102. At this timing, it is also possible to cause the user of the voice assistant 102 to input an ID and a password for the service server 103 by voice or via the mobile terminal 104.

Figure 6A:
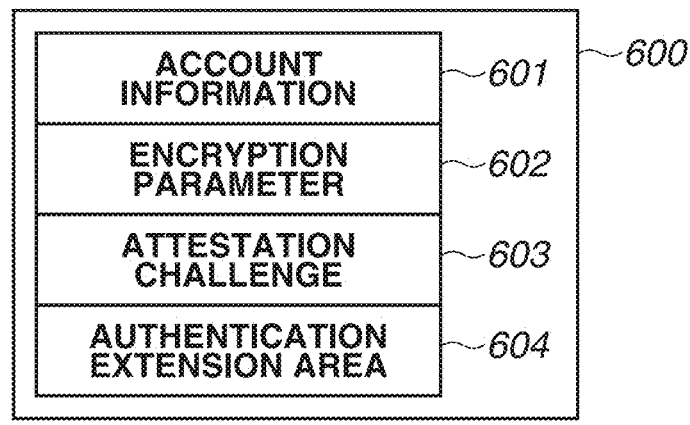
FIGS. 6A, 6B, and 6C are diagrams illustrating parameters for use in a registration process related to biological information.

In step S405, the legacy authentication processing unit 332 performs an authentication process using the ID and the password received by the request processing unit 331. If the authentication is successful, then in step S406, the registration parameter creation unit 333 creates registration parameters 600. With reference to FIG. 6A, the registration parameters 600 are described.

The registration parameters 600 include account information 601, an encryption parameter 602, an attestation challenge 603, and an authentication extension area 604. The account information 601 indicates attribute information, such as the user ID specified in the legacy authentication in step S405. The encryption parameter 602 indicates attribute information regarding authentication information to be registered, such as an encryption algorithm supported by the service server 103. The attestation challenge 603 is a parameter used to perform challenge-response authentication. In the authentication extension area 604, an extension parameter to be used for each service is stored.

Figure 6B:
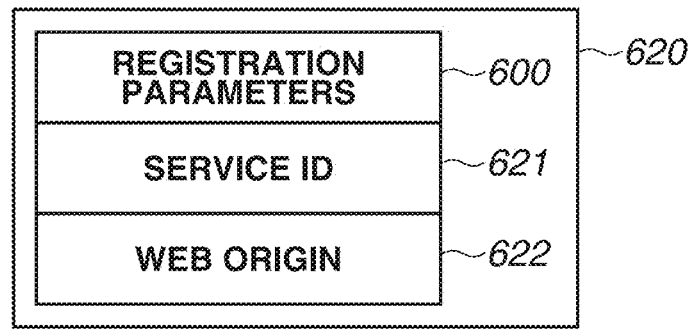

In step S407, the request processing unit 331 returns a credential creation request to the voice assistant 102 as a response to step S404. The credential creation request includes data 620 illustrated in FIG. 6B.

The data 620 includes the registration parameters 600 illustrated in FIG. 6A, a service ID 621, and a web origin 622. The web origin 622 is the origin of a service hosted by the service server 103. The service ID 621 stores information of the top-level domain and the second-level domain of the service. For example, if the URL of a shopping service is "http://www.shopping.com", the service ID 621 is "shopping.com".

In step S408, using the speaker unit 219, the voice transmission unit 312 transmits a message (a machine voice) confirming with the user whether to agree to register voiceprint information and face information. This message is generated based on the credential creation request received by the voice processing unit 313 in step S407. For example, the voice transmission unit 312 transmits a message such as "Do you register biological information?"

In step S409, the voice reception unit 311 receives, as a voice instruction from the user, a response indicating the intention of agreeing to register biological information. For example, it is assumed that the voice processing unit 313 receives a voice instruction such as "Yes".

In step S410, using the speaker unit 219, the voice transmission unit 312 transmits a message (a machine voice) urging the user to utter a keyword for registering a voiceprint.

In step S411, using the microphone 218, the voice reception unit 311 receives, as a voice instruction from the user, a response to the message for the registration, including the keyword for registering biological information (a voiceprint). The voice processing unit 313 extracts voiceprint information from the voice instruction.

In step S412, as illustrated in table A, the biological information processing unit 316 saves the voiceprint information extracted in step S411 in association with an authentication information ID and a service ID in the TPM 215.

In step S413, using the camera 217 and based on the motion of the user's lips or the direction of the face, the face detection unit 315 acquires a face image of the user having responded in step S411 and acquires a feature amount for performing face recognition. In step S414, the biological information processing unit 316 further saves in the TPM 215 the feature amount acquired in step S413 in association with the authentication information ID and the service ID used in step S412.

In step S415, based on the registration of the biological information in steps S412 to S414, the key creation unit 318 creates and saves a public key and a private key. As illustrated in table B, the biological information processing unit 316 saves in the TPM 215 the created private key in association with the authentication information ID and the service ID used in steps S412 to S414.

Figure 6C:
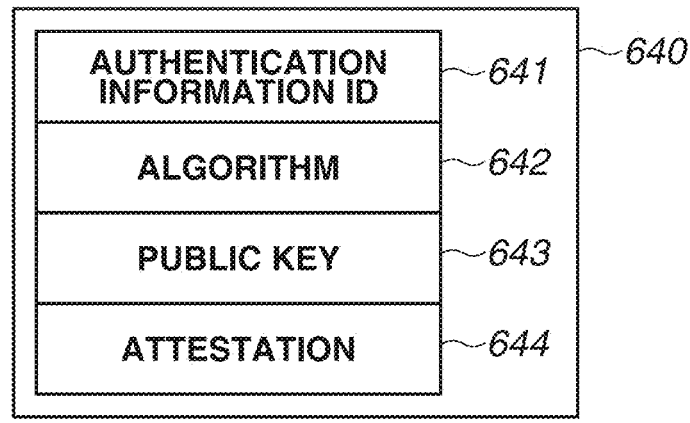

In step S416, the credential creation unit 319 creates a credential 640 as illustrated in FIG. 6C. The credential 640 includes an authentication information ID 641, an algorithm 642, a public key 643, and an attestation 644. The authentication information ID 641 and the public key 643 are the public key created in the process of step S415 and an ID corresponding to the public key. The algorithm 642 corresponds to each of algorithms used to create the pair of the private key and the public key in step S415. Further, the attestation 644 is obtained by encrypting the attestation challenge 603 using the private key generated in step S415. In step S417, the request processing unit 321 transmits the credential created in step S416 to the service server 103.

In step S418, the user management unit 335 of the service server 103 saves the credential (the public key) received via the request processing unit 331 in association with the user ID of the user of which the legacy authentication is performed in step S405. In this process, the user management unit 335 decrypts the attestation using the public key included in the credential and verifies whether the attestation matches the attestation challenge created in step S406. Only if the verification is successful, the user management unit 335 saves the credential.

In step S419, the request processing unit 331 returns the processing result (success or failure of the saving) to the voice assistant 102. In step S420, the voice transmission unit 312 notifies the user of a voice based on the result received in step S419.

A sequence diagram illustrated in FIG. 4B is a variation of "the process of registering biological information in the voice assistant". In FIG. 4A, the biological information of the user is registered in the voice assistant 102. In this variation, a description is given of an extension where, by the cooperation of the voice assistant 102 and the mobile terminal 104 of the user, the mobile terminal 104 performs biometric authentication.

The processes of steps S401 to S409 are similar to those in FIG. 4A, and therefore are not described here.

In step S450, the request processing unit 321 of the voice assistant 102 transfers the credential creation request received in step S407 to the mobile terminal 104 of the user of the voice assistant 102. In step S451, using the speaker unit 219, the voice transmission unit 312 transmits a message (a machine voice) urging the user to register biological information (fingerprint information) in the mobile terminal 104.

In step S452, the biometric authentication control unit 353 of the mobile terminal 104 waits for the user to input biological information to the biological information sensor 257 and receives the biological information. In step S453, the biological information processing unit 352 registers the provided biological information (fingerprint) in association with an authentication information ID and a service ID in the TPM 255. In step S454, based on the registration of the biological information, the key creation unit 354 creates and saves a public key and a private key. The biological information processing unit 352 saves the created private key in association with the authentication information ID and the service ID in the TPM 255.

In step S455, the credential creation unit 355 creates a credential similar to that illustrated in FIG. 6C. In this process, as an authentication information ID and a public key, the information generated in steps S453 and S454 is used. In step S456, the mobile terminal 104 transmits the created credential to the voice assistant 102.

In the processes of steps S417 to S420, processing similar to that in FIG. 4A is performed using the credential created in step S455, and therefore is not described here.

According to FIG. 4B, the voice assistant 102 can use an external authentication device with high authentication accuracy.

Next, with reference to a sequence diagram illustrated in FIG. 5, the details of "the process of executing an instruction using the voice assistant" are described.

In step S501, the voice reception unit 311 receives a voice instruction from the user. For example, examples of the instruction can include "I want to purchase XX through the shopping service A" and "I want to play YY (the title of a music composition)". In step S502, the voice processing unit 313 temporarily saves the voice information received in step S501. In step S503, similarly to step S413, based on the motion of the user's lips, the face detection unit 315 specifies the user having uttered the voice in step S501, acquires face information of the user, and temporarily saves the face information.

In step S504, if an instruction is detected by analyzing the voice data received in step S501, the voice processing unit 313 generates a request corresponding to the instruction. According to the analysis result, the transmission destination of the request is determined. In the present exemplary embodiment, a description is provided of an example of a case where the voice data is analyzed as an instruction to make a request to the service server 103. The request processing unit 321 issues the generated request to the service server 103.

In step S505, based on the content of the request issued in step S504 and acquired via the request processing unit 331, the authentication determination unit 336 of the service server 103 determines whether authentication is needed to perform processing based on the request. According to the determination of whether authentication is needed, the processing switches.

In a case where authentication is not needed, then in step S506, the service execution unit 338 executes the processing based on the content of the request issued in step S504. In the present exemplary embodiment, the execution of a broadcast service for service guide provided in common for all users or a general search service, for each of which a user does not need to be confirmed, and the acquisition and the generation of a response message are assumed. In step S507, the service execution unit 338 returns, to the voice assistant 102 via the request processing unit 331, a response to the request issued in step S504. This response includes a message to be transmitted from the voice assistant 102 to the user.

In step S508, the voice processing unit 313 acquires the message included in the returned response and notifies the user of the message via the voice transmission unit 312. In this process, the information temporarily saved in the voice assistant 102 in steps S502 and S503 is deleted.

Next, a description is provided of the processing performed in a case where it is determined in step S505 that authentication is needed.

Figure 7A:
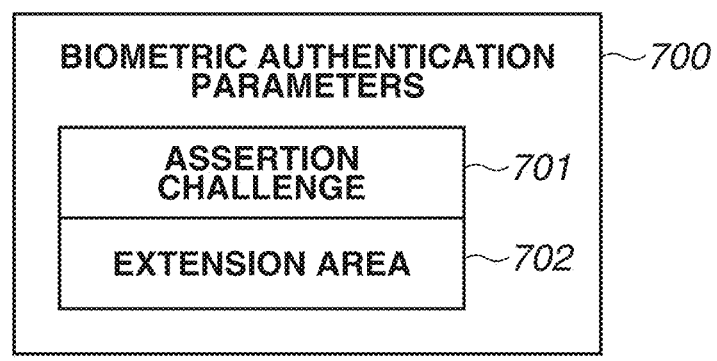
FIGS. 7A and 7B are diagrams illustrating parameters for use in biometric authentication.

In step S510, the authentication determination unit 336 creates biometric authentication parameters as illustrated in FIG. 7A and transmits the biometric authentication parameters to the voice assistant 102 via the request processing unit 331.

Biometric authentication parameters 700 include an assertion challenge 701 and an extension area 702. The assertion challenge 701 is a parameter used to perform challenge-response authentication. In the extension area 702, an extension parameter for the service server 103 to control processing regarding biometric authentication in the voice assistant 102 is stored.

In step S511, the voice processing unit 313 and the face detection unit 315 extract the feature amounts of the pieces of information temporarily saved in steps S502 and S503. In step S512, the biometric authentication control unit 317 collates the feature amounts extracted in step S511 with biological information saved in the TPM 215, to execute a biometric authentication process. In step S513, it is determined whether the biometric authentication is successful. According to whether the authentication succeeds or fails, the processing switches.

In a case where the biometric authentication fails, then in step S514, using the speaker unit 219, the voice transmission unit 312 notifies the user that the biometric authentication failed.

Next, a description is provided of the processing performed in a case where it is determined in step S513 that the biometric authentication is successful.

Figure 7B:
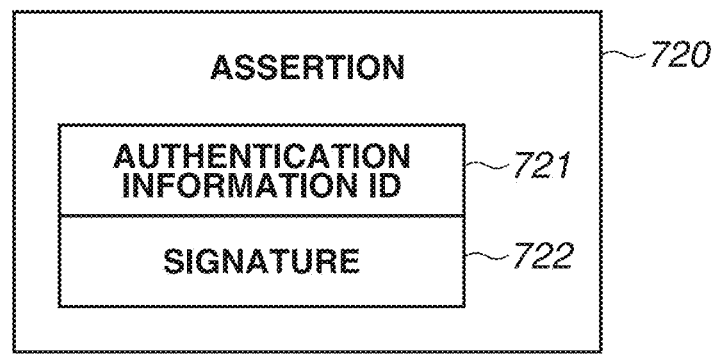

In step S515, the assertion creation unit 320 creates assertion data as illustrated in FIG. 7B. An assertion 720 includes an authentication information ID 721 and a signature 722. The authentication information ID is information managed in table A in association with the biological information of which the authentication is successful in step S513, and with a service ID corresponding to the service server 103. The signature 722 is generated using the assertion challenge 701 included in the authentication request received in step S510, and a private key managed in table B in association with the authentication information ID corresponding to the biological information of which the authentication is successful in step S513. In step S516, the request processing unit 321 transmits the assertion created in step S512 to the service server 103.

In step S517, the verification unit 337 of the service server 103 executes a verification process for verifying the received assertion. In the verification process, data obtained by decrypting the signature included in the assertion, using a public key managed in association with the authentication information ID included in the assertion by the user management unit 335 is compared with the assertion challenge 701 included in the biometric authentication parameters created by the authentication determination unit 336 in step S510. Based on the determination of whether the verification is successful in step S518, the processing switches.

In a case where the verification fails, then in step S519, the verification unit 337 returns, to the voice assistant 102 via the request processing unit 331, a response indicating that the verification failed. In step S520, using the speaker unit 219, the voice transmission unit 312 notifies the user that the biometric authentication failed.

Next, a description is provided of the processing performed in a case where it is determined in step S518 that the verification is successful.

In step S521, the service execution unit 338 executes the processing based on the content of the request issued in step S504. In the present exemplary embodiment, the execution of a music distribution service, a shopping service, or a payment service for member users, for each of which a user needs to be confirmed, and the acquisition and the generation of a response message are executed. In step S522, the service execution unit 338 returns, to the voice assistant 102 via the request processing unit 331, a response to the request issued in step S504. This response includes a message that is generated as a result of the process of step S521 and should be transmitted from the voice assistant 102 to the user.

In step S523, the voice processing unit 313 acquires the message included in the returned response and notifies the user of the message via the voice transmission unit 312.

In a case where the processing illustrated in FIG. 4B is performed, the authentication request in step S510 is transferred from the voice assistant 102 to the mobile terminal 104. As an application example of the first exemplary embodiment, in this case, the user presents biological information, such as a fingerprint, to the mobile terminal 104, and the mobile terminal 104 executes a biometric authentication process equivalent to step S512. In a case where the authentication is successful, the assertion creation unit 356 of the mobile terminal 104 creates assertion data as illustrated in FIG. 7B. This assertion data is transmitted from the request processing unit 321 of the voice assistant 102 to the service server 103. The processing after this is similar to the processes of steps S517 to S523.

The first exemplary embodiment is based on the premise that a user having provided a voice instruction regarding a service that needs authentication, such as a shopping service, has authority to make a purchase. For example, in a shopping service, there is a case where only an optional user (a user account of parents) in a user group including family members has authority to pay for the service. In such a case, if a voice instruction corresponding to a user account of a child is provided, a permission process including authentication needs to be performed on another user having authority to execute the service. In a second exemplary embodiment, the provision of a service including such a permission process is described in detail based mainly on the difference between the first and second exemplary embodiments.

For the present exemplary embodiment, a mobile terminal of an approval user having authority to pay for a service is added. This mobile terminal includes configurations similar to those of the mobile terminal 104 described in FIGS. 2C and 3C in the first exemplary embodiment.

The user management unit 335 of the service server 103 includes data as illustrated in table C. This data is registered through a registration screen and a registration service prepared as the functions of a service provided by the service server 103.

TABLE C

| User ID | Service ID | Whether Execution Is Allowed | Approval User | Notification Destination |
|---|---|---|---|---|
| user A | shopping.com | true | NULL | userA@xxx.ne.jp |
| user B | shopping.com | false | user A | userB@xxx.ne.jp |
| . | . | . | | |
| . | . | . | | |
| . | . | . | | |

A "user ID" column indicates the ID of a user having given a voice instruction. A "service ID" column indicates the service ID 621 of a service hosted by the service server 103. A "whether execution is allowed" column indicates whether each user is permitted to execute the service indicated by the service ID. Table C indicates that a user A is permitted to execute the service (true), but a user B is prohibited from executing the service (false). With respect to each service, a method for determining whether the execution of the service is allowed is defined. For example, a threshold can be set for a user's age to limit the execution of the service. Alternatively, a user interface (UI) can be separately provided to enable the selection of a user who is not allowed to execute the service. An "approval user" column indicates the user ID of an approval user with authority to permit the provision of a service corresponding to a request from a user prohibited from executing the service (false). The user A is permitted to execute the service by their own authority. Thus, no approval user is set (NULL) for the user A. A "notification destination" column indicates the notification destination of a user indicated in the "user ID" column. For example, a telephone number or an email address of the mobile terminal 104 is set. In table C, if a request regarding "shopping.com" is received from the user B, the notification destination of the user A, who is the approval user, namely "userA@xxx.ne.jp", is notified of a confirmation request.

Figure 8:
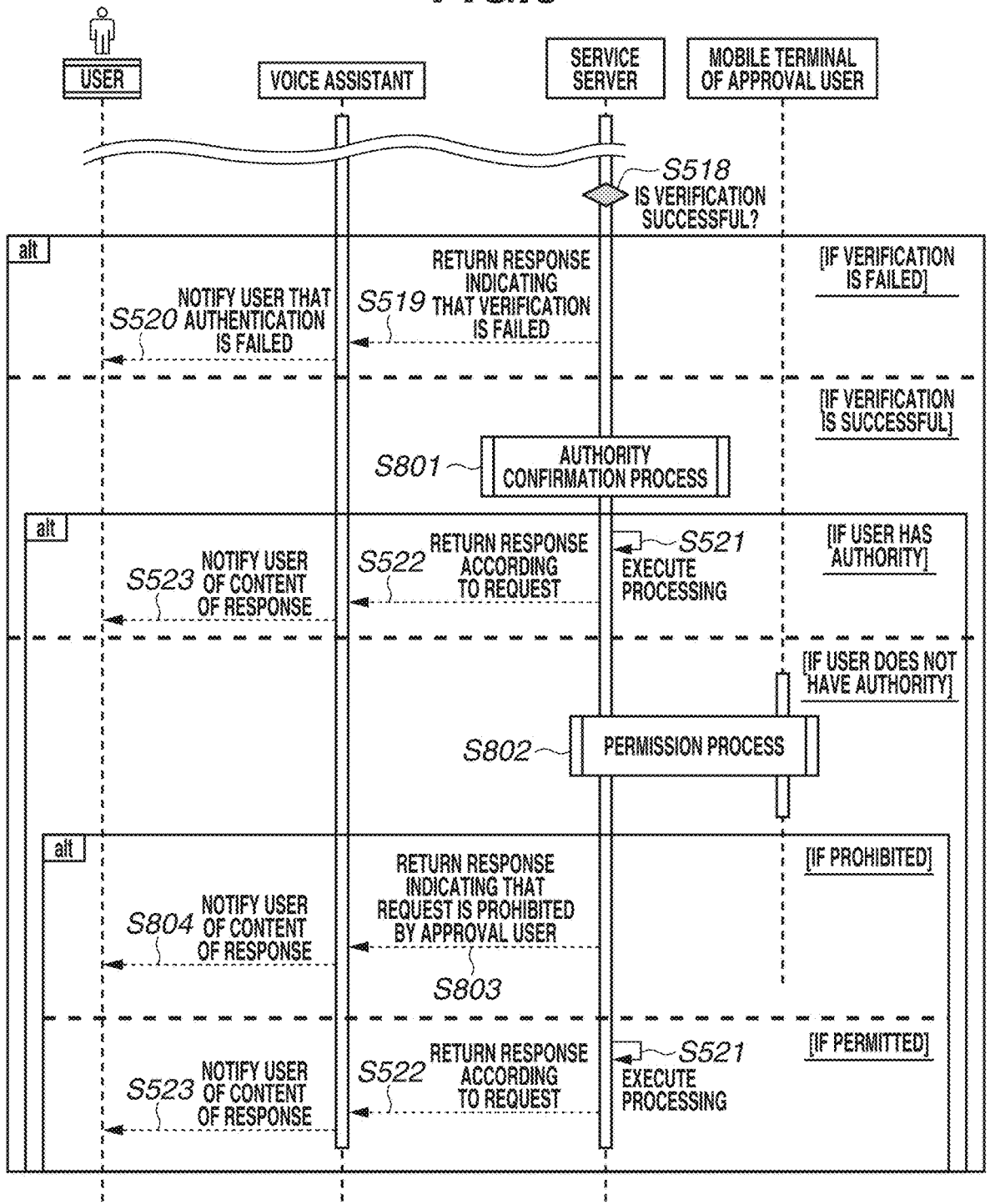
FIG. 8 is a diagram illustrating a sequence regarding an entirety of processing according to a second exemplary embodiment.

FIG. 8 illustrates a sequence diagram including an extension part of the processes of step S518 and after that in the sequence in FIG. 5.

In a case where the verification of the assertion fails, steps S519 and S520 are similar to those in FIG. 5.

Figure 9:
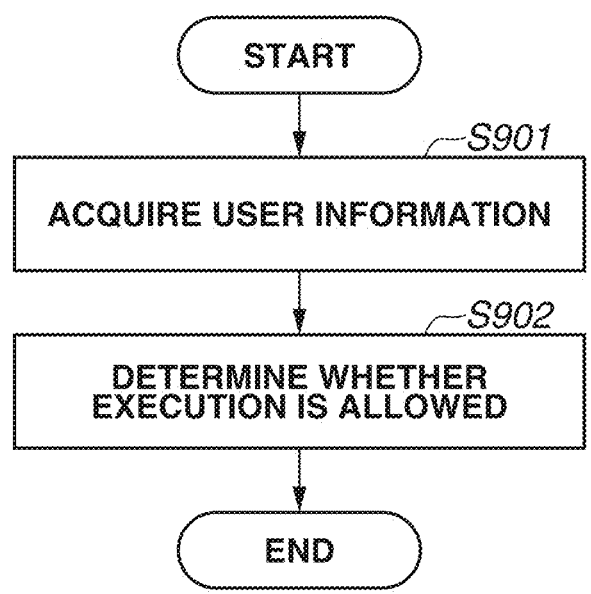
FIG. 9 is a flowchart illustrating a confirmation process for confirming authority according to the second exemplary embodiment.

In a case where the verification of the assertion is successful, then in step S801, a confirmation process for confirming authority is executed. With reference to FIG. 9, the details of the process of step S801 are described.

In step S901, the authority determination unit 339 of the voice assistant 102 acquires, from table C managed by the user management unit 335, information regarding the user ID of the user having provided the instruction by voice. In step S902, the authority determination unit 339 references the "whether execution is allowed" column included in the information acquired in step S901 and confirms whether the user has authority to execute the service.

As a result of the process of step S801, in a case where the user having provided the instruction by voice has authority to execute the service, processes similar to those of steps S521 to S523 in FIG. 5 are performed. As a result of the process of step S801, in a case where the user having provided the instruction by voice does not have authority to execute the service, the processing proceeds to step S802.

In step S802, the confirmation request unit 341 cooperates with the mobile terminal of the approval user to execute a permission process. The details of this process will be described below with reference to FIG. 10. As a result of step S802, a response indicating permission or prohibition of the execution of the instruction requested by the voice instruction is obtained from the mobile terminal of the approval user.

In a case where the execution is prohibited, then in step S803, the confirmation request unit 341 returns to the voice assistant 102 a response indicating that the approval user prohibits the requested processing. In step S804, the voice processing unit 313 acquires a message included in the returned response and notifies the user of the message via the voice transmission unit 312.

As a result of step S802, in a case where the execution is permitted, processes similar to those of steps S521 to S523 in FIG. 5 are performed.

Figure 10:
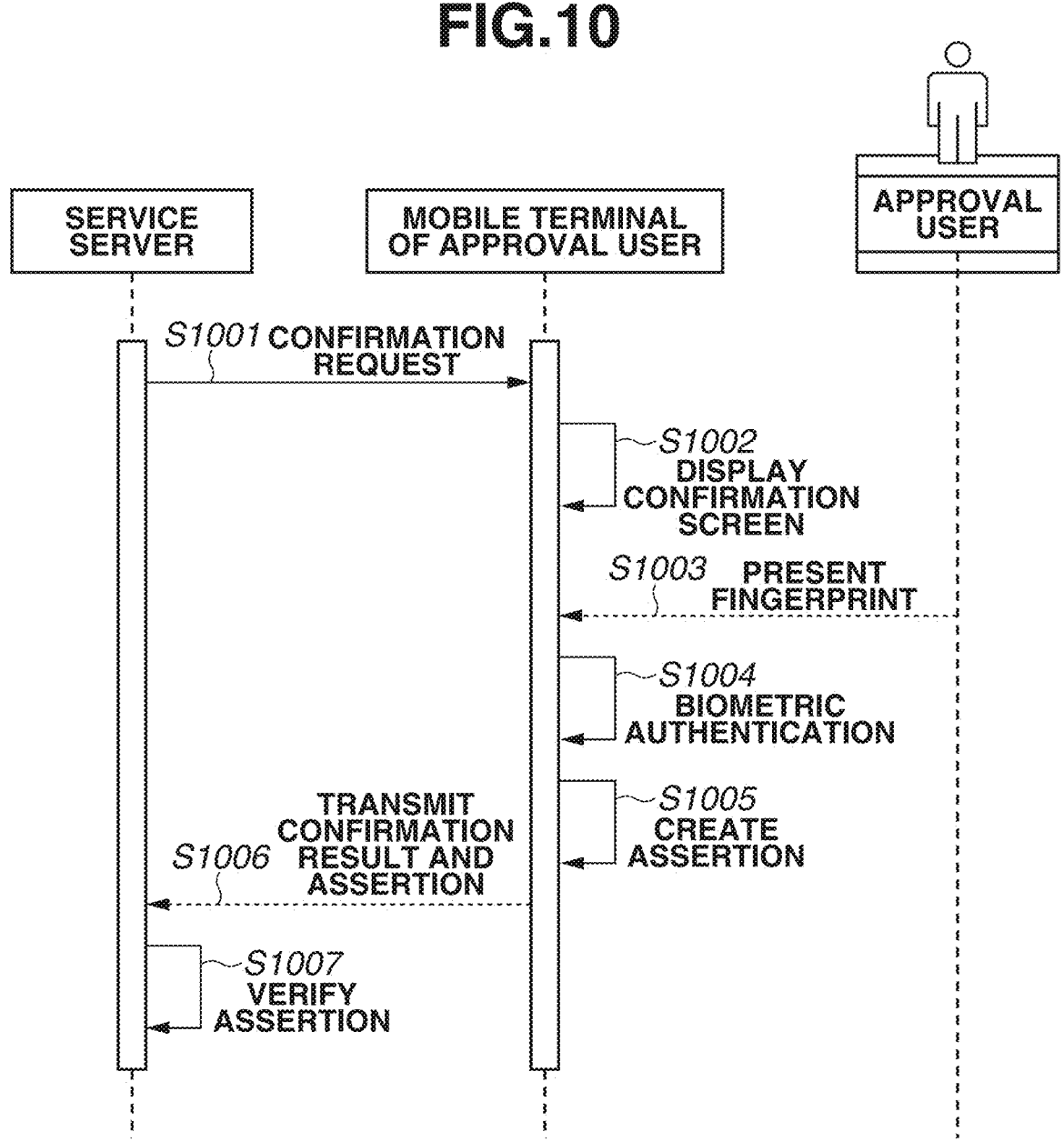
FIG. 10 is a diagram illustrating a sequence regarding details of the confirmation process according to the second exemplary embodiment.

With reference to FIG. 10, the details of the process of step S802 are described. In the present exemplary embodiment, a credential for the mobile terminal of the approval user is also already registered in the service server 103 by a procedure as illustrated in FIG. 4B.

In step S1001, the confirmation request unit 341 of the service server 103 issues a request for a confirmation process to the mobile terminal of the approval user. In this process, the confirmation request unit 341 also transmits biometric authentication parameters for the approval user as illustrated in FIG. 7A.

Figure 11A:
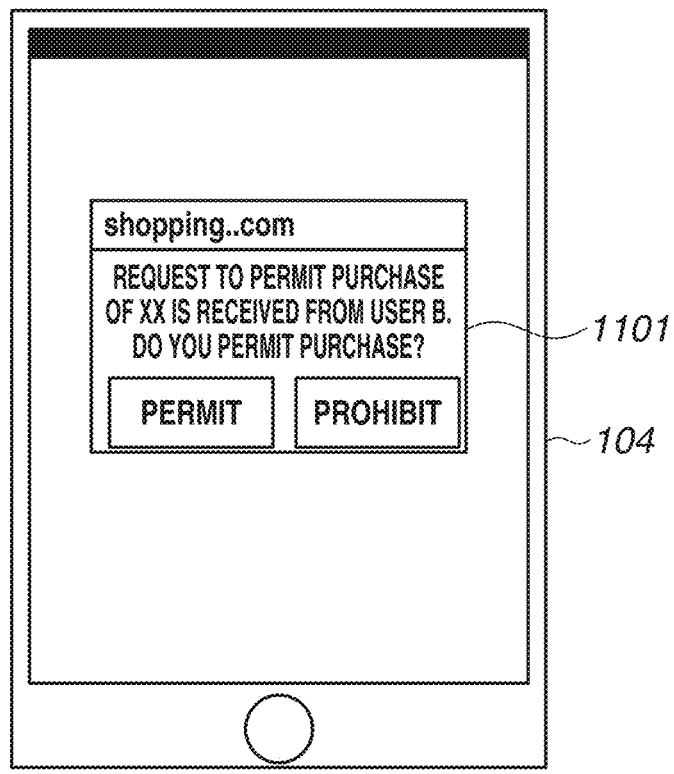
FIGS. 11A and 11B are diagrams illustrating examples of a graphical user interface (GUI) according to the second exemplary embodiment.
Figure 11B:
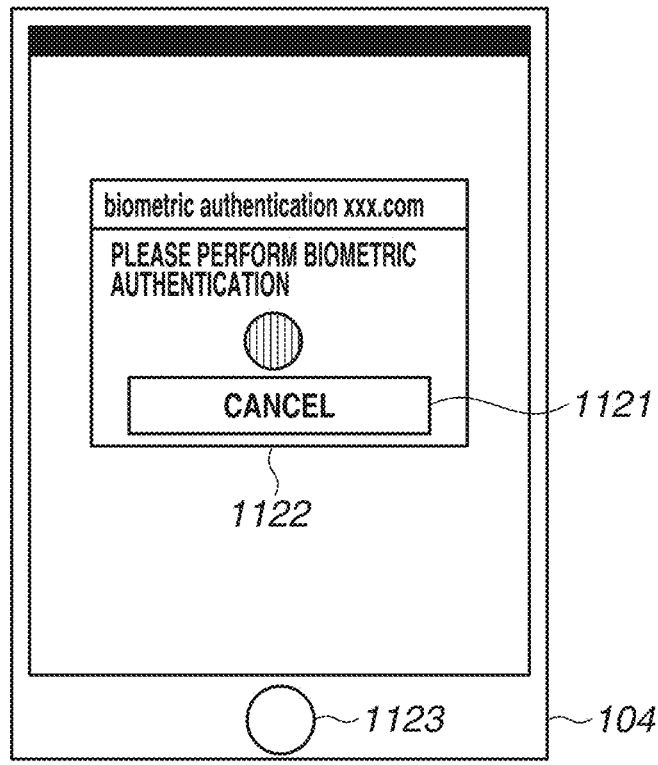

In step S1002, the execution confirmation unit 357 of the mobile terminal of the approval user displays on the touch panel 258 a confirmation screen as illustrated in FIG. 11A. The approval user can provide an input regarding whether to permit the instruction of a request provided by the user of the voice assistant 102. Next, the biological information processing unit 352 displays on the touch panel 258 an authentication screen as illustrated in FIG. 11B. In step S1003, the mobile terminal of the approval user receives the presentation of biological information (a fingerprint) of the user.

In step S1004, the biometric authentication control unit 353 executes a biometric authentication process using the biological information registered in the TPM 255. In a case where the biometric authentication is successful, then in step S1005, the assertion creation unit 356 creates assertion data similar to that illustrated in FIG. 7B.

In step S1006, the transmission/reception unit 351 transmits a confirmation result (permission or prohibition of the execution) received from the user via the confirmation screen, and the assertion data to the service server 103.

In step S1007, the verification unit 337 verifies the received assertion. In a case where the verification is successful, then, based on the confirmation result (permission or prohibition of the execution), the processes of step S802 and the subsequent steps in FIG. 8 are executed.

In the second exemplary embodiment, a confirmation request is made to the mobile terminal of the approval user to achieve a permission process. In a third exemplary embodiment, a description is provided of an example where this permission process is also achieved by the cooperation of the approval user and another voice assistant. Specifically, as illustrated in FIG. 12, using another voice assistant, the approval user achieves the permission process in step S802 described in the second exemplary embodiment. In the present exemplary embodiment, the differences between the present exemplary embodiment and the first and second exemplary embodiments are described in detail.

In the present exemplary embodiment, another voice assistant used by the approval user includes configurations similar to those in FIGS. 2A and 3A.

In the present exemplary embodiment, the user management unit 335 of the service server 103 includes data as illustrated in table D. This data is registered via a registration screen and a registration service prepared as the functions of a service provided by the service server 103. In table D, as the notification destination, an ID or a network address for uniquely identifying a voice assistant is set. Since there is also a possibility that a certain user owns a plurality of voice assistants, the IDs of a plurality of voice assistants can be set as the notification destination.

TABLE D

| User ID | Service ID | Whether Execution Is Allowed | Approval User | Notification Destination |
|---|---|---|---|---|
| user A | shopping.com | True | Null | 06D85C22-41B7 A8152E15-3542 |
| user B | shopping.com | False | user A | B0E819D0-EFAD |
| . | . | . | | |
| . | . | . | | |
| . | . | . | | |

In table D, two IDs are set as the notification destination of the user A. That is, the user A owns voice assistants identified by these two IDs. Regarding the user A, a confirmation notification is provided to either or both of the voice assistants.

Next, with reference to FIG. 12, the details of a permission process according to the present exemplary embodiment are described.

In step S1201, the confirmation request unit 341 of the service server 103 issues a confirmation request to the voice assistant of the approval user. In this process, the confirmation request unit 341 also transmits biometric authentication parameters for the approval user as illustrated in FIG. 7A.

In step S1202, using the camera 217, the face detection unit 315 of the voice assistant that received the confirmation request determines whether a person at the notification destination is captured. Specifically, the face detection unit 315 makes this determination by extracting a feature amount from a face image captured by the camera 217 and collating the feature amount with the face feature amount of the approval user saved in the TPM 215. The process of step S1202 can be omitted.

In step S1203, the execution confirmation unit 322 notifies the user of a message (a machine voice) such as "A request to permit the purchase of XX is received from the user B. Do you permit or prohibit the purchase?" via the voice transmission unit 312. In step S1204, the voice processing unit 313 and the execution confirmation unit 322 extract the content of an instruction such as "Yes (permission)" or "No (prohibition)" from the user in voice data received via the microphone 218 by the voice reception unit 311.

In step S1205, based on the motion of the user's lips, the face detection unit 315 specifies the user having mentioned permission in step S1204 and acquires face information of the user. In step S1206, the voice processing unit 313 and the face detection unit 315 extract feature amounts from the pieces of information acquired in steps S1204 and S1205. In step S1207, the biometric authentication control unit 317 collates the extracted feature amounts with biological information saved in the TPM 215, to execute a biometric authentication process. In step S1208, using a private key managed in association with an authentication information ID corresponding to the biological information used for the authentication when the biometric authentication is successful, the assertion creation unit 320 creates an assertion illustrated in FIG. 7B.

In step S1209, the request processing unit 321 transmits the assertion created in step S1208 and a confirmation result (permission or prohibition) to the service server 103. In step S1210, the verification unit 337 verifies the received assertion using a public key managed in association with the authentication information ID. In a case where the verification is successful, then, based on the confirmation result (permission or prohibition of the execution), the processes of step S802 and subsequent steps in FIG. 8 are executed.

In FIG. 12, the approval user performs biometric authentication using the feature amounts of a voiceprint and a face image with the voice assistant. As an application example of the third exemplary embodiment, if the approval user has performed processing equivalent to FIG. 4B, it is also possible to transfer the confirmation request received by the voice assistant in step S1201 to the mobile terminal of the approval user, and cause the approval user to input an instruction regarding permission and perform biometric authentication with the mobile terminal.

In this process, the mobile terminal of the approval user that received the confirmation request from the voice assistant executes processes similar to those of steps S1002 to S1005 illustrated in FIG. 10. Then, the transmission/reception unit 351 transmits a confirmation result (permission or prohibition of the execution) received from the user via the confirmation screen, and the assertion data to the voice assistant as the transmission source of the confirmation request. The voice assistant transfers the confirmation result (permission or prohibition of the execution) and the assertion data to the service server 103. Consequently, a verification process for verifying the assertion similar to that in step S1209 illustrated in FIG. 12 is executed.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-183524, filed Sep. 25, 2017, which is hereby incorporated by reference herein in its entirety.

What is claimed is:

1. An information processing terminal for receiving and processing an input of voice information, the information processing terminal comprising:
   a speaker;
   a memory storing instructions, and
   at least one processor executing the instructions causing the information processing terminal to:
   store identification information that is necessary for identifying a user based on user's information;
   output, in a case where authentication is not needed for execution of a first service corresponding to the input, a message regarding the execution of the first service via the speaker as a response to the input;
   issue a service request for a second service to a service server based on the input;
   perform, in a case where a server request for an authentication request is received from the service server, the authentication request about the user identified using the stored identification information corresponding to the input, to an authentication control unit;
   request, in a case where biometric authentication according to the authentication request is successful by the authentication control unit to which biological information of the user is presented, a verification process using data based on the biometric authentication to the service server, wherein the data based on the biometric authentication includes a signature created using a private key corresponding to the biological information used in the biometric authentication which has been successful by the authentication control unit, and
   output, in a case where the biometric authentication is successful and verification is successful in the verification process, a message regarding the execution of the second service via the speaker as a response to the input of the voice information,
   wherein the message regarding the execution of the second service is output via the speaker in a case where, in the verification process, the verification of the signature using a public key corresponding to the private key is successful in the service server.

2. The information processing terminal according to claim 1, wherein biological information is extracted from the input voice information to perform the biometric authentication by the authentication control unit as an authentication controller of the information processing terminal.

3. The information processing terminal according to claim 1, wherein the authentication control unit is an authentication controller of the information processing terminal or an authentication controller of a mobile terminal of the user corresponding to the store information.

4. A method in an information processing terminal, including a speaker, for receiving and processing an input of voice information, the method comprising:
- storing identification information that is necessary for identifying a user based on user's information;
- outputting, in a case where authentication is not needed for execution of a first service corresponding to the input, a message regarding the execution of the first service via the speaker as a response to the input;
- issuing a service request for a second service to a service server based on the input;
- performing control, in a case where a server request for an authentication request is received from the service server, the authentication request about the user identified using the stored identification information corresponding to the input, to an authentication control unit;
- requesting, in a case where biometric authentication according to the authentication request is successful by the authentication control unit to which biological information of the user is presented, a verification process using data based on the biometric authentication to the service server, wherein the data based on the biometric authentication includes a signature created using a private key corresponding to the biological information used in the biometric authentication which has been successful by the authentication control unit, and
- outputting, in a case where the biometric authentication is successful and verification is successful in the verification process, a message regarding the execution of the second service via the speaker as a response to the input of the voice information,
- wherein the message regarding the execution of the second service is output via the speaker in a case where, in the verification process, the verification of the signature using a public key corresponding to the private key is successful in the service server.

5. The method according to claim 4, wherein biological information is extracted from the input voice information to perform the biometric authentication by the authentication control unit as an authentication controller of the information processing terminal.

6. The information processing terminal according to claim 4, wherein the authentication control unit is an authentication controller of the information processing terminal or an authentication controller of a mobile terminal of the user corresponding to the stored information.

7. A non-transitory computer readable storage medium storing a computer program for causing a computer to execute a method for receiving and processing an input of voice information, the method comprising:
- storing identification information that is necessary for identifying a user based on user's information;
- outputting, in a case where authentication is not needed for execution of a first service corresponding to the input, a message regarding the execution of the first service via a speaker of the computer as a response to the input;
- issuing a service request for a second service to a service server based on the input;
- performing control, in a case where a server request for an authentication request is received from the service server, the authentication request about the user identified using the stored identification information corresponding to the input, to an authentication control unit;
- requesting, in a case where biometric authentication according to the authentication request is successful by the authentication control unit to which biological information of the user is presented, a verification process using data based on the biometric authentication to the service server, wherein the data based on the biometric authentication includes a signature created using a private key corresponding to the biological information used in the biometric authentication which has been successful by the authentication control unit, and
- outputting, in a case where the biometric authentication is successful and verification is successful in the verification process, a message regarding the execution of the second service via the speaker as a response to the input of the voice information,
- wherein the message regarding the execution of the second service is output via the speaker in a case where, in the verification process, the verification of the signature using a public key corresponding to the private key is successful in the service server.

8. A system comprising:
- an information processing terminal; and
- a service server,
- wherein the information processing terminal comprises:
- a speaker;
- a memory storing instructions, and
- a processor executing the instructions causing the information processing terminal to:
- receive an input of voice information;
- store identification information that is necessary for identifying a user based on user's information;
- issue, a service request to the service server based on the input voice information;
- perform, in a case where a server request for an authentication request is received from the service server, the authentication request about the user identified using the stored identification information corresponding to the input, to an authentication control unit; and
- request, in a case where biometric authentication according to the authentication request is successful by the authentication control unit to which biological information of the user is presented, a verification process using data based on the biometric authentication to the service server, wherein the data based on the biometric authentication includes a signature created using a private key corresponding to the biological information used in the biometric authentication which has been successful by the authentication control unit,
- wherein the service server comprises:
- a memory storing instructions, and
- a processor executing the instructions causing the service server to:
- transmit the server request for the authentication request to the information processing terminal for processing corresponding to the issued service request;
- execute the verification process using the data based on the biometric authentication;
- execute, based on success of verification in the verification process, processing corresponding to the issued service request; and
- return a result of the processing to the information processing terminal,
- wherein the instructions stored in the memory of the information processing terminal further cause the information processing terminal to output a message, via the speaker, corresponding to the result returned from the service server as a response to the input of the voice information, and wherein in a case where the verification of the signature using a public key corresponding to the private key is successful, the processing corresponding to the issue service request is executed in the service server.

9. The system according to claim 8, wherein, biological information is extracted from the input voice information to perform the biometric authentication by the authentication control unit as an authentication controller of the information processing terminal.

\* \* \* \* \*